United States Patent
Wei et al.

(10) Patent No.: US 9,008,661 B2
(45) Date of Patent: Apr. 14, 2015

(54) SYSTEMS AND METHODS FOR SERVICE IN MULTIMEDIA BROADCAST MULTICAST SERVICES

(75) Inventors: Hung-Yu Wei, Taipei (TW); Ching-Chun Chou, Taipei (TW); Tzu-Ming Lin, Jhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 217 days.

(21) Appl. No.: 13/561,526

(22) Filed: Jul. 30, 2012

(65) Prior Publication Data

US 2013/0035129 A1     Feb. 7, 2013

Related U.S. Application Data

(60) Provisional application No. 61/515,337, filed on Aug. 5, 2011.

(51) Int. Cl.
| | | |
|---|---|---|
| *H04W 74/00* | (2009.01) | |
| *H04W 4/06* | (2009.01) | |
| *H04W 76/00* | (2009.01) | |

(52) U.S. Cl.
CPC .............. *H04W 4/06* (2013.01); *H04W 76/002* (2013.01)

(58) Field of Classification Search
USPC .............. 455/436, 443, 444, 432.1, 503, 3.01
See application file for complete search history.

(56) References Cited

U.S. PATENT DOCUMENTS

| | | |
|---|---|---|
| 7,787,893 B2 | 8/2010 | Jeong et al. |
| 2008/0037472 A1 | 2/2008 | Ryu et al. |
| 2009/0061914 A1 | 3/2009 | Cai |
| 2010/0103854 A1 | 4/2010 | Lee et al. |
| 2010/0110963 A1 | 5/2010 | Huang et al. |
| 2010/0195622 A1 | 8/2010 | Buchmayer et al. |
| 2010/0254348 A1 | 10/2010 | Prakash et al. |
| 2010/0322128 A1 | 12/2010 | Becker et al. |
| 2011/0077006 A1 | 3/2011 | Hsu |
| 2011/0149825 A1 | 6/2011 | Lavi et al. |
| 2011/0149827 A1 | 6/2011 | Na et al. |

OTHER PUBLICATIONS

Yanover et al., "Improvement in MBS in 802.16REV2", IEEE 802.16 Broadband Wireless Access Working Group, IEEE C802.16maint-08/171r11, Sep. 16, 2008, pp. 1-8.

Abuhaija et al., "LTE Capacity and Service Continuity in Multi Radio Environment", 2010 Fourth Int'l Conference on Next Generation Mobile Applications, Services and Technologies, Aug. 26, 2010, pp. 131-136.

Christophorou et al., "Handover Control in MBMS Enabled 3G Mobile Cellular Networks", 2007. 16th 1st Mobile and Wireless Communications Summit, Sep. 4, 2007, 5 pages total.

(Continued)

*Primary Examiner* — Tu X Nguyen
(74) *Attorney, Agent, or Firm* — Finnegan, Henderson, Farabow, Garrett & Dunner LLP

(57) ABSTRACT

A method for providing service among a plurality of Multicast Broadcast Single Frequency Networks (MBSFNs) that are providing multimedia broadcast services, includes storing a pointer in data to be transmitted by a base station corresponding to a serving of a first MBSFN. The pointer points to either a location of a multimedia broadcast multicast service (MBMS) control channel or a location of MBMS data in a second MBSFN.

15 Claims, 10 Drawing Sheets

(56) References Cited

OTHER PUBLICATIONS

Tian et al., "A Novel SFN Broadcast Services Selection Mechanism in Wireless Cellular Networks", IEEE Communications Society subject matter experts for publication in the WCNC 2008 proceedings, Apr. 15, 2008, pp. 1974-1978.

Christophorou et al., "MBMS Handover Control for Efficient Multicasting in IP-Based 3G Mobile Networks", IEEE Communications Society subject matter experts for publication in the IEEE ICC 2006 proceedings, Dec. 11, 2006, pp. 2112-2117.

Etemad et al., "Multicast and Broadcast Multimedia Services in Mobile WiMAX Networks", IEEE Communications Magazine, Oct. 2, 2009, pp. 84-91.

Office Action (Notice of Office Action) dated Sep. 25, 2013, issued in Korean Patent Application No. 10-2012-0085326 along with English translaion of same (14 pages total).

3GPP TS 36.331 V9.7.0 (Jun. 2011) (253 pages).

SYSTEMS AND METHODS FOR SERVICE IN MULTIMEDIA BROADCAST MULTICAST SERVICES

RELATED APPLICATIONS

This application is based upon and claims the benefit of priority from U.S. Provisional Patent Application No. 61/515,337, filed Aug. 5, 2011, the entire contents of which are incorporated herein by reference.

FIELD OF THE DISCLOSURE

This disclosure relates to systems and methods for service in multimedia broadcast multicast services in a wireless communication system.

BACKGROUND

A multicast and/or broadcast service (MBS), also known as a multimedia broadcast multicast service (MBMS), provides content data to a plurality of users who desire to receive such a service in a communication network. For example, the content data may include movies, games, files, software programs, or TV programs, and may be provided by one or more content providers.

Conventionally, a plurality of Multicast Broadcast Single Frequency Networks (MBSFNs) may each provide the MBMS. For example, two separate MBSFNs may provide the same MBMS (broadcasting service). Accordingly, base stations within a MBSFN provide data with respect to the MBMS to a user equipment (UE). Each base station corresponds to a cell, the area to which a base station provides signals. Therefore, all the cells included in a MBSFN may provide the MBMS data. Conventionally, when a user moves from one MBSFN to another, the conventional transmission schemes might result in service continuity problems. For example, if a user moves across the boundary of one MBSFN to a new MBSFN, UE needs to disconnect from a cell in the current MBSFN and hand off to a cell in the new MBSFN. The handoff process requires the UE to stop receiving the MBMS data in a current cell, connect to another cell in the new MBSFN, search for the service information of the MBMS in the cell of the new MBSFN, and start to receive the MBMS again.

SUMMARY

According to one of the embodiments of the present disclosure, there is provided a method of providing service among a plurality of MBSFNs, wherein each MBSFN contains one or more cells, while a UE of a wireless communication system receives a broadcasting service in a serving cell of the one or more cells in one of the MBSFNs. The method comprises storing a pointer in data to be transmitted by a base station corresponding to the serving cell in a first one of the MBSFNs, the pointer stored in a MBMS control channel (MCCH) of the first MBSFN and pointing to either a location of MCCH or MBMS data in a second one of the MBSFNs, or the pointer stored in a system information block of the first MBSFN and pointing to the location of the MCCH in the second MBSFN; and transmitting the data by the base station for the first MBSFN for receipt by the UE.

According to one of the embodiments of the present disclosure, there is provided a method of providing service among a plurality of MBSFNs for a UE of a wireless communication system. The method comprises receiving data by the UE from a base station that is included in a first one of the MBSFNs; determining by the UE whether the received data includes a pointer to a second one of the MBSFNs, the pointer stored in a MCCH of the first one of the MBSFNs and pointing to either a location of MCCH or MBMS data in the second one of the MBSFNs or the pointer stored in a system information block of the first one of the MBSFNs and pointing to the location of the MCCH in the second one of the MBSFNs; and sending by the UE a service join request to the second one of the MBSFNs for continuing the MBMS being received from the first one of the MBSFNs based on the pointer.

According to one of the embodiments of the present disclosure, there is provided a UE to receive an MBMS, comprising one or more processors, the one or more processors being configured to: receive data from a base station that is included in a first one of MBSFNs; determine whether the received data includes a pointer to a second one of the MBSFNs, the pointer stored in an MCCH of the first one of the MBSFNs and pointing to either a location of MCCH or MBMS data in the second one of the MBSFNs or the pointer stored in a system information block of the first one of the MBSFNs and pointing to the location of the MCCH in the second one of the MBSFNs; and send a service join request to the second one of the MBSFNs for continuing the MBMS being received from the first one of the MBSFNs based on the pointer.

According to one of the embodiments of the present disclosure, there is provided a non-transitory computer-readable storage medium storing one or more programs, wherein the one or more programs comprise instructions that, when executed by a computing device, cause the device to: receive data from a base station that is included in a first one of Multicast Broadcast Single Frequency Networks (MBSFNs); determine whether the received data includes a pointer to a second one of the MBSFNs, the pointer stored in a multimedia broadcast multicast service (MBMS) control channel (MCCH) of the first one of the MBSFNs and pointing to either a location of MCCH or MBMS data in the second one of the MBSFNs or the pointer stored in a system information block of the first one of the MBSFNs and pointing to the location of the MCCH in the second one of the MBSFNs; and send a service join request to the second one of the MBSFNs for continuing a MBMS being received from the first one of the MBSFNs based on the pointer.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Figure 1:
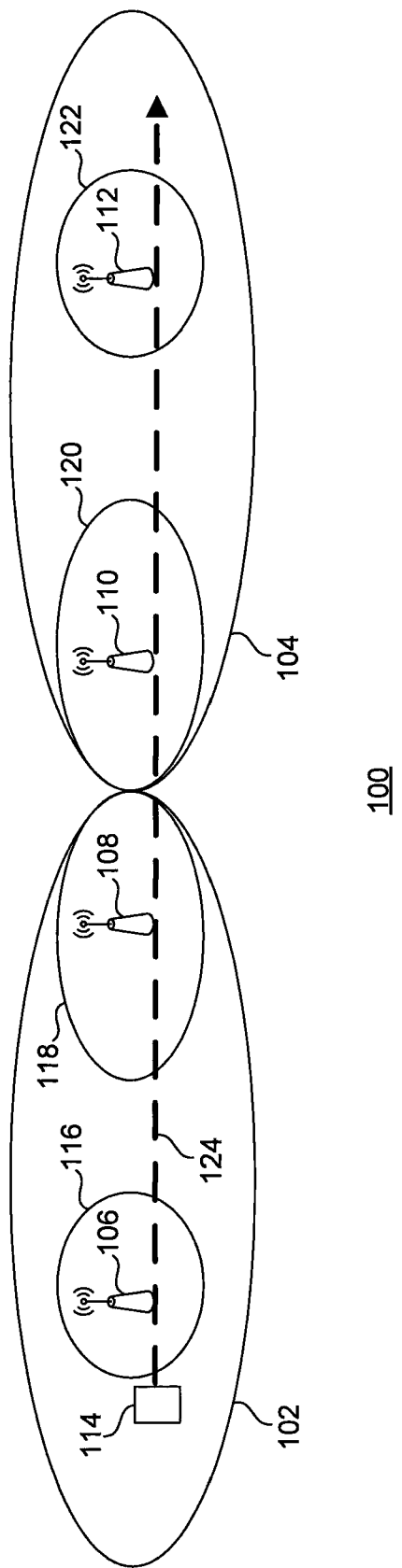
FIG. 1 illustrates a block diagram of a system for providing service between a plurality of MBSFNs, according to an exemplary embodiment.

Reference will now be made in detail to exemplary embodiments, examples of which are illustrated in the accompanying drawings. The following description refers to the accompanying drawings in which the same numbers in different drawings represent the same or similar elements, unless otherwise represented. The implementations set forth in the following description of exemplary embodiments consistent with the present invention do not represent all implementations consistent with the invention. Instead, they are merely examples of systems and methods consistent with aspects related to the invention, as recited in the appended claims.

In exemplary embodiments, there are provided systems and methods with respect to data transmission for multicast broadcast services (MBSs), also known as multimedia broadcast multicast services (MBMSs), over a plurality of single frequency networks. The application of a single frequency network in an MBMS is referred to as a Multicast Broadcast Single Frequency Network (MBSFN) in 3 G communication systems. A plurality of MBSFNs, according to some embodiments, may provide the same MBMS (broadcasting service). Each MBSFN may include one or more cells. A cell refers to an area of service covered by a respective base station. In some embodiments, a user equipment (UE) receiving a broadcasting service or MBMS that is provided over two separate MBSFNs may travel from the coverage area of a first MBSFN to a second MBSFN. The cell providing the broadcasting service or MBMS to the UE at a particular time may be referred to as a serving cell. According to exemplary embodiments, in a handoff process, a UE may stop receiving an MBMS from the current serving cell in the first MBSFN and connect to another serving cell in the second MBSFN. Exemplary embodiments may utilize pointers provided in data from the current serving cell in the first MBSFN to make the handoff process possibly more efficient. Pointers may be included in the signals of an MBMS transmission in the first MBSFN and provide the UE with the information of nearby cells that are part of the second MBSFN. The UE can then utilize information in the pointer to locate the MBMS data in the second MBSFN, as soon as it comes within the coverage area of a cell (serving cell) in the second MBSFN. Accordingly, when the UE moves from the first MBSFN to the second MBSFN, the UE utilizing the pointer does not need to disconnect from the MBMS and search for a system information block (SIB) from the new cell, which would entail disconnecting and reconnecting to the MBMS. Instead, the UE may start receiving the MBMS in the second MBSFN once it enters the cell coverage because the UE already has been provided information through the pointer on where to seek the MBMS data when the UE enters the second MBSFN's coverage area. Accordingly, a pointer providing information related to the MBMS data location and MBSFN area information might enables the UE to avoid disruption of service continuity.

Accordingly, in some embodiments, a system information block (SIB) may be generated on a cell basis to be broadcast by a corresponding base station to a UE. As a result, the UE can receive the SIB once it enters the coverage area of a particular cell. The SIB included a service area identity (SAI) of an MBMS and the frequency of the MBMS, as MBMS assistance information. Since the SIB is a cell-specific message, different cells broadcast SIBs have different contents. For each cell, the UE, after receiving the SIB, locates the frequency of MBMS data in an MBMS control channel (MCCH). The information in the MCCH may indicate that channels that comprise multicast channel (MCH) data are identical throughout an MBSFN. The MCCH carries the frequency and offset of the MCH. That is, the UE may receive the MBMS, which is in the MCH, after it reads the MCCH.

Accordingly, in some exemplary embodiments, a pointer may be stored in the data that comprises an SIB or an MCCH that is being transmitted in a cell in a first MBSFN. For example, the pointer may be stored in the MCCH of the first MBSFN and point to either a location of the MCCH or MBMS data in a second MBSFN. Alternatively, the pointer may be stored in the SIB of the first MBSFN and point to the location of the MCCH in the second MBSFN. This data including the pointer may then be transmitted to a UE from a base station in the cell.

As the UE begins to transition from the first MBSFN to the second MBSFN, the handoff process might be more efficient, as the UE does not need to receive the SIB from a cell of the second MBSFN; instead, the UE already knows the location of either the MCCH or the MCH in the next serving cell from the second MBSFN. Accordingly, the UE might be able to start receiving the MBMS or the broadcasting service with less delay or without delay.

FIG. 1 illustrates a block diagram of a system 100 for providing service between a plurality of MBSFNs, according to an exemplary embodiment. System 100 includes an MBSFN 102 and an MBSFN 104. System 100 includes one or more base stations, such as base stations 106, 108, 110, and 112. For example, base stations 106 and 108 may be in MBSFN 102, and base stations 110 and 112 may be in MBSFN 104. The area covered by signals from a base station is referred to as a cell. For example, cell 116 corresponds to base station 106, cell 118 corresponds to base station 108, cell 120 corresponds to base station 110, and cell 122 corresponds to base station 112. In addition, system 100 further includes at least one UE 114 that receives an MBMS or broadcasting service from base stations 106, 108, 110, and 112 when it is within the cell of each respective base station. In an exemplary embodiment, UE 114 travels on a path 124 from cell 116 to cell 122. MBSFN 102 and MBSFN 104 are adjacent to each other and contain cells 108 and cells 110, respectively, that are adjacent to each other.

Utilizing methods discussed below according to exemplary embodiments, users might be able to efficiently access and receive broadcasting service data or MBMS data as UE 114 transitions from the coverage area of MBSFN 102 to the coverage area of MBSFN 104.

Figure 2:
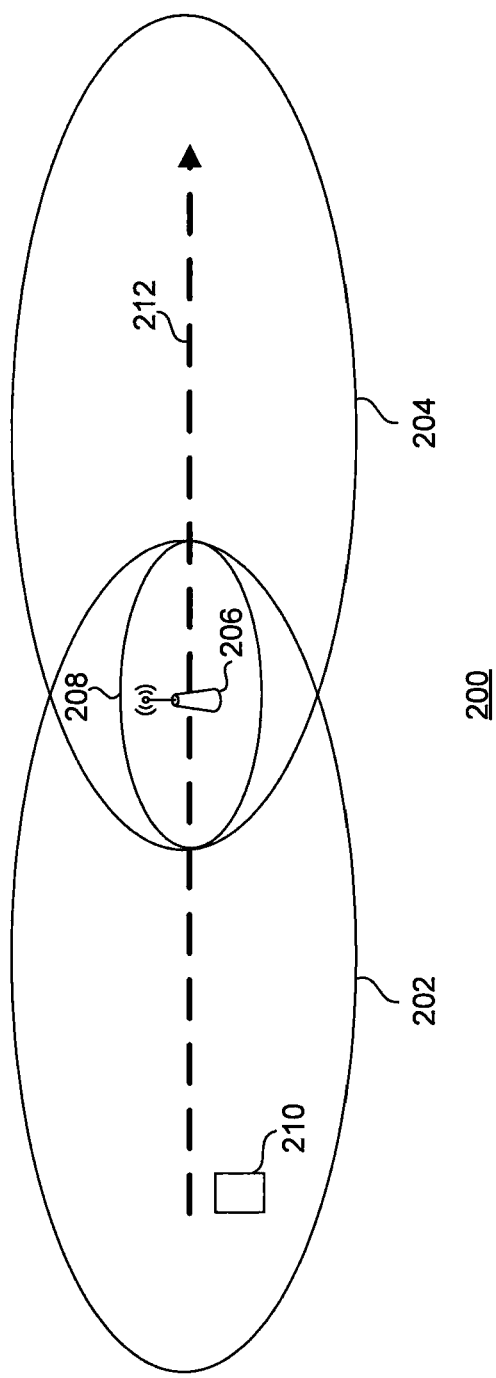
FIG. 2 illustrates a block diagram of another system for providing service between a plurality of MBSFNs, according to an exemplary embodiment.

FIG. 2 illustrates a block diagram of a system 200 for providing service between a plurality of MBSFNs, according to an exemplary embodiment. System 200 includes an MBSFN 202 and an MBSFN 204. System 200 includes one or more base stations, such as base station 206. Cell 208 corresponds to base station 206. Additionally, base station 206 is included in both MBSFN 202 and MBSFN 204. Accordingly, MBSFN 202 and MBSFN 204 overlap over cell 208. Therefore, cell 208 is a serving cell for a UE 210 that receives broadcasting services from base station 206 in both MBSFNs 202 and 204. In an exemplary embodiment, UE 210 travels on a path 212 from MBSFN 202 to MBSFN 204. While only base station 206 is illustrated in FIG. 2, MBSFNs 202 and 204 may contain additional base stations with corresponding cells.

Utilizing methods discussed below according to exemplary embodiments, users might be able to efficiently access and receive broadcasting data or MBMS data as UE 210 transitions from MBSFN 202 and MBSFN 204. For example, cell 208 may serve as an edge cell of MBSFN 202 and MBSFN 204. Therefore, cell 208 may provide information corresponding to MBSFN 204 in the data transmitted for MBSFN 202 to the UE 210. Then based on the information corresponding to MBSFN 204, UE 210 may acquire MBMS data from MBSFN 204 in cell 208.

Figure 3:
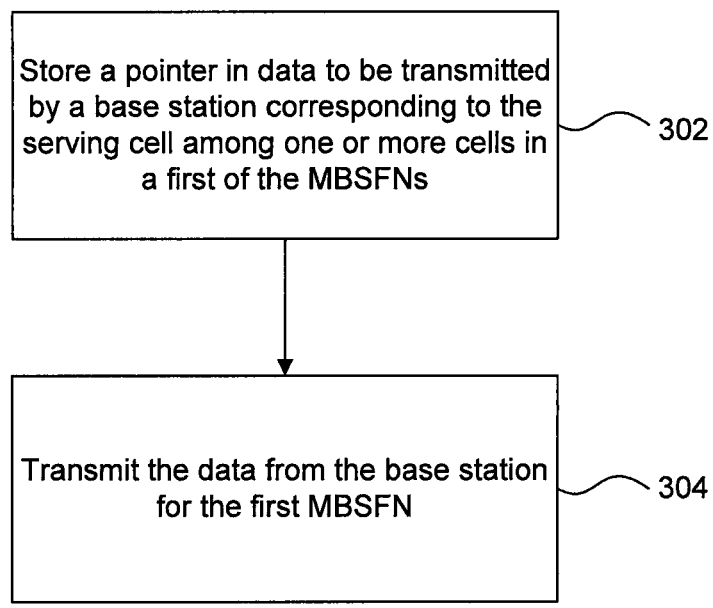
FIG. 3 illustrates a method for providing service between a plurality of MBSFNs, according to an exemplary embodiment.

FIG. 3 illustrates a method 300 for providing service between a plurality of MBSFNs, according to an exemplary embodiment.

First, a pointer is stored in data to be transmitted by a respective base station corresponding to a serving cell among one or more cells in a first one of the MBSFNs (step 302). The pointer stored in the data may be a stored MCCH of the first MBSFN and may point to either a location of the MCCH or MBMS data in a second one of the MBSFNs, or the pointer may be stored in an SIB of the first MBSFN and point to the location of the MCCH in the second MBSFN. For example, referring back to FIG. 1, the pointer may be stored in data to be transmitted by base station 108, which is adjacent to base station 110.

Figure 5:
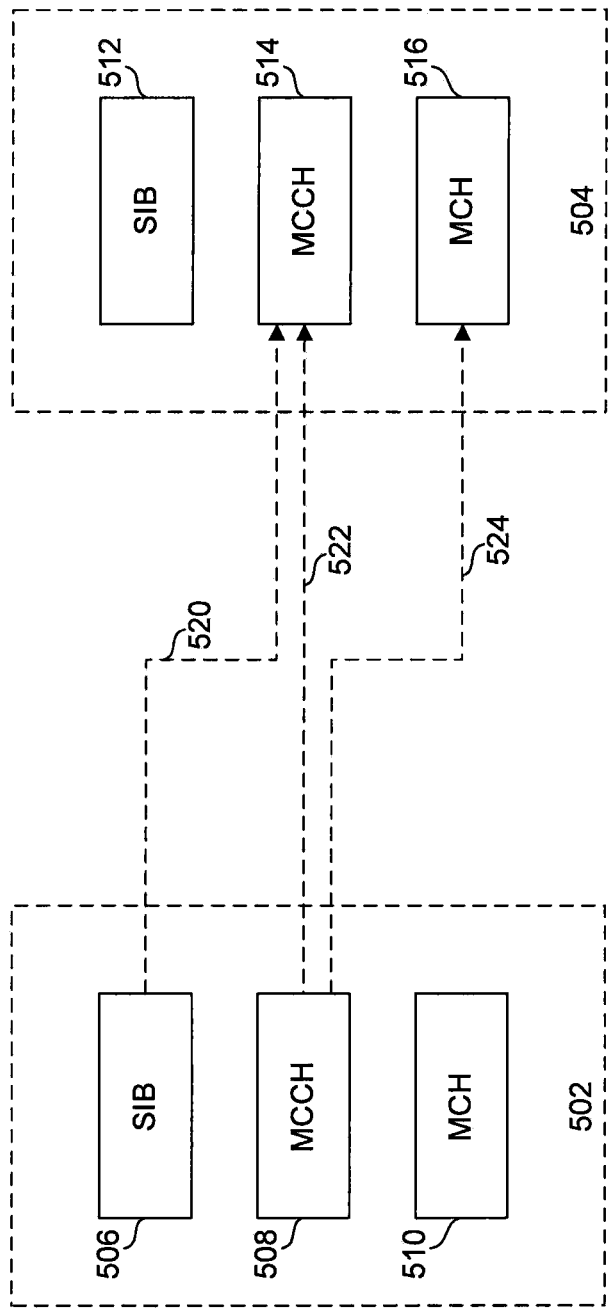
FIG. 5 illustrates pointer relationships, according to an exemplary embodiment.

FIG. 5 illustrates pointer relationships according to an exemplary embodiment. For example, a first MBSFN 502 and a second MBSFN 504 are shown. A UE (not shown in FIG. 5) is assumed to be currently provided an MBMS by a serving cell in MBSFN 502. Therefore, MBSFN 502 is considered the current serving MBSFN, and MBSFN 504, to which the UE hands off, is considered the target MBSFN. MBSFNs 502 and 504 may be similar to MBSFNs 102 and 104 (shown in FIG. 1), respectively, as well as MBSFNs 202 and 204 (shown in FIG. 2), respectively. SIB 506, MCCH 508, and MCH 510 may be contained within information being provided to the UE by the serving cell in MBSFN 502. Similarly, SIB 512, MCCH 514, and MCH 516 may be contained within information being provided by a cell in MBSFN 504. For example, assuming MBSFNs 502 and 504 are similar to MBSFNs 102 and 104, respectively, shown in FIG. 1, SIB 506, MCCH 508, and MCH 510 may be transmitted by base station 108, and SIB 512, MCCH 514, and MCH 516 may be transmitted by base station 110. Furthermore, a pointer 520 in SIB 506 points to the location of MCCH 514 in MBSFN 504. Pointers 522 and 524 in MCCH 508 point to MCCH 514 and MCH 516, respectively. Accordingly, before the UE connects to MBSFN 504, the UE is aware of the location of either MCCH 514 or MCH 516 of MBSFN 504. Pointers 520, 522, and 524 are all illustrated as being stored in MBSFN 502. However, any of pointers 520, 522, and 524 may be stored independently or as a combination. For example, data that is stored to be broadcast by base station 108 in cell 118 may only include pointer 520 in SIB 506 generated for cell 118. Therefore, UE 114 may access MBMS data based on pointer 520 indicating the location of MCCH 514 in MBSFN 504.

Next, referring back to the method shown in FIG. 3, the data is transmitted from the base station of the first MBSFN (step 304). For example, base station 108 may transmit the data in cell 118 for MBSFN 102. Accordingly, UE 114, when located within the coverage area of cell 118, may receive this data including pointers with respect to cell 120 of MBSFN 104.

Figure 4:
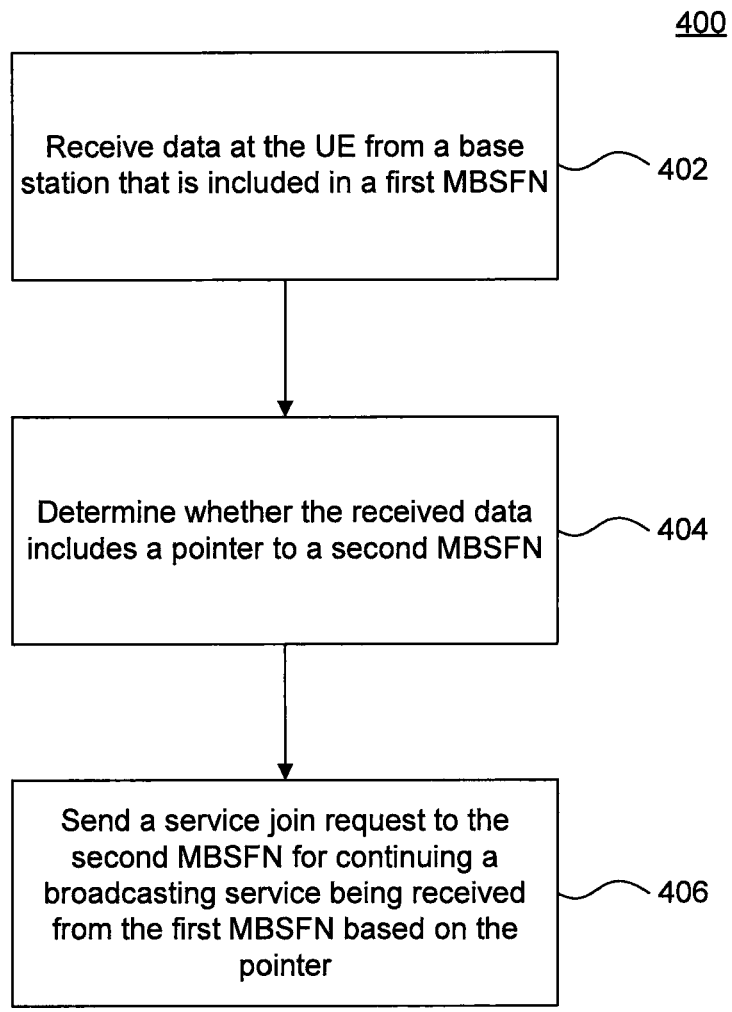
FIG. 4 illustrates a method for providing service in MBSFNs for a UE of a wireless communication system, according to an exemplary embodiment.

FIG. 4 illustrates a method 400 for providing service in MBSFNs for a UE of a wireless communication system, according to an exemplary embodiment.

First, data is received at the UE from a base station that is included in a first MBSFN (step 402). For example, UE 114 receives data in cell 118 based on signals from base station 108 while traveling on path 124.

Next, it is determined whether the received data includes a pointer to a second MBSFN (step 404). A pointer may be stored in the data in the first MBSFN and point to either a location of the MCCH or MBMS data in the second MBSFN, or the pointer may be stored in an SIB of the first MBSFN and point to the location of the MCCH in the second MBSFN. For example, the data received by UE 114 in cell 118 of MBSFN 102 may include information related to cell 120 in MBSFN 104. For example, pointer 520 may be included in SIB 506 that points to the location of MCCH 514 in MBSFN 504. Accordingly, when a handoff occurs for UE 114 while travelling on path 124 from cell 118 to cell 120, instead of first acquiring SIB in a cell of MBSFN 104, UE 114 may already know where MCCH is located in the cell of MBSFN 504. For example, instead of first acquiring SIB 512 of MBSFN 504, UE 114 may already know where MCCH 514 is located.

Next, a service join request is sent to the second MBSFN for continuing a broadcasting service being received from the first MBSFN based on the pointer (step 406). For example, if information is provided to UE 114 by SIB 506 regarding the location of MCCH 514 in MBSFN 104, as soon as the handoff occurs, UE 114 is able to request continuing the broadcasting service (MBMS) based on a pointer from cell 120. That is, SIB 512 does not have to be acquired by UE 114 to locate MCCH 514. Accordingly, pointer 520 allows UE 114 to know the location of MCCH 514 as soon as the handoff occurs and to access the MBMS in MCH 516.

In an exemplary embodiment, it may be determined before step 404 that the serving cell is an edge cell of the first MBSFN, which may determine if the received data includes a pointer. Accordingly, the determination to check whether a pointer is included or not would only take place when it is determined that the serving cell is an edge cell, for possibly more efficient use of resources by UE 114.

In some embodiments, if the serving cell is not an edge cell of the first MBSFN, the UE does not process the step of determining whether the received data includes the pointer.

In some embodiments, if the serving cell is not an edge cell of the first MBSFN, the UE does not process the step of sending a service join request to the second one of the MBSFNs.

In some embodiments, the serving cell may be determined to be an edge cell by inspecting a list of edge cells accessible to UE 114. Alternatively, a determination may be made that the serving cell is an edge cell as a function of a calculation based on a least common multiple (LCM) of the edge cell identities.

Figure 6:
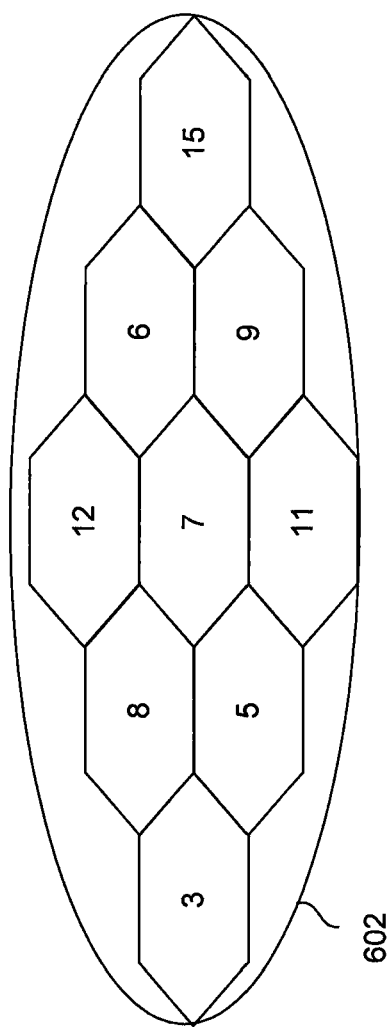
FIG. 6 illustrates a determination of edge cells based on cell identities, according to an exemplary embodiment.

FIG. 6 illustrates a determination of edge cells based on cell identities, according to an exemplary embodiment. An exemplary MBSFN 602 includes cells having cell identities 3, 5, 6, 7, 8, 9, 11, 12, and 15. Every cell apart from cell 7 may be an edge cell. Therefore, the values of the edge cells 3, 5, 6, 8, 9, 11, 12, and 15 may be utilized to produce a function based on cell identities. For example, the LCM of cell identities for cells 3, 5, 6, 8, 9, 11, 12, and 15 is 1320. Accordingly, a function can be included that the LCM is divided by a serving cell's identity number to determine if it is an edge cell.

For example, 1320 divided by 15—the identity of cell 15—produces a whole number, which indicates that cell 15 is an edge cell. However, 1320 divided by 7—the identity of cell 7—produces a fraction, indicating that it is not an edge cell. This function may be carried out in UE 114 (FIG. 1) to determine whether it is currently operating in an edge cell or not. Accordingly, when the serving cell is an edge cell, the UE can check whether pointers are included in the data provided to it. However, if the serving cell is not an edge cell, a handoff to a different MBSFN is not likely to occur; therefore, there is no need to check for pointers.

In other exemplary embodiments, cyclic redundancy checks or other encoding techniques may be applied to detect whether a serving cell is an edge cell.

In some exemplary embodiments, multiple carrier services may be provided within a cell that is covered by a base station. An MBMS may utilize one or more of these multiple carrier services. Accordingly, all of the carrier services to which a UE may potentially connect may not provide the MBMS. In such a case, a second inter-cell pointer can be included that points to carrier services providing MBMS in a particular cell.

Figure 7:
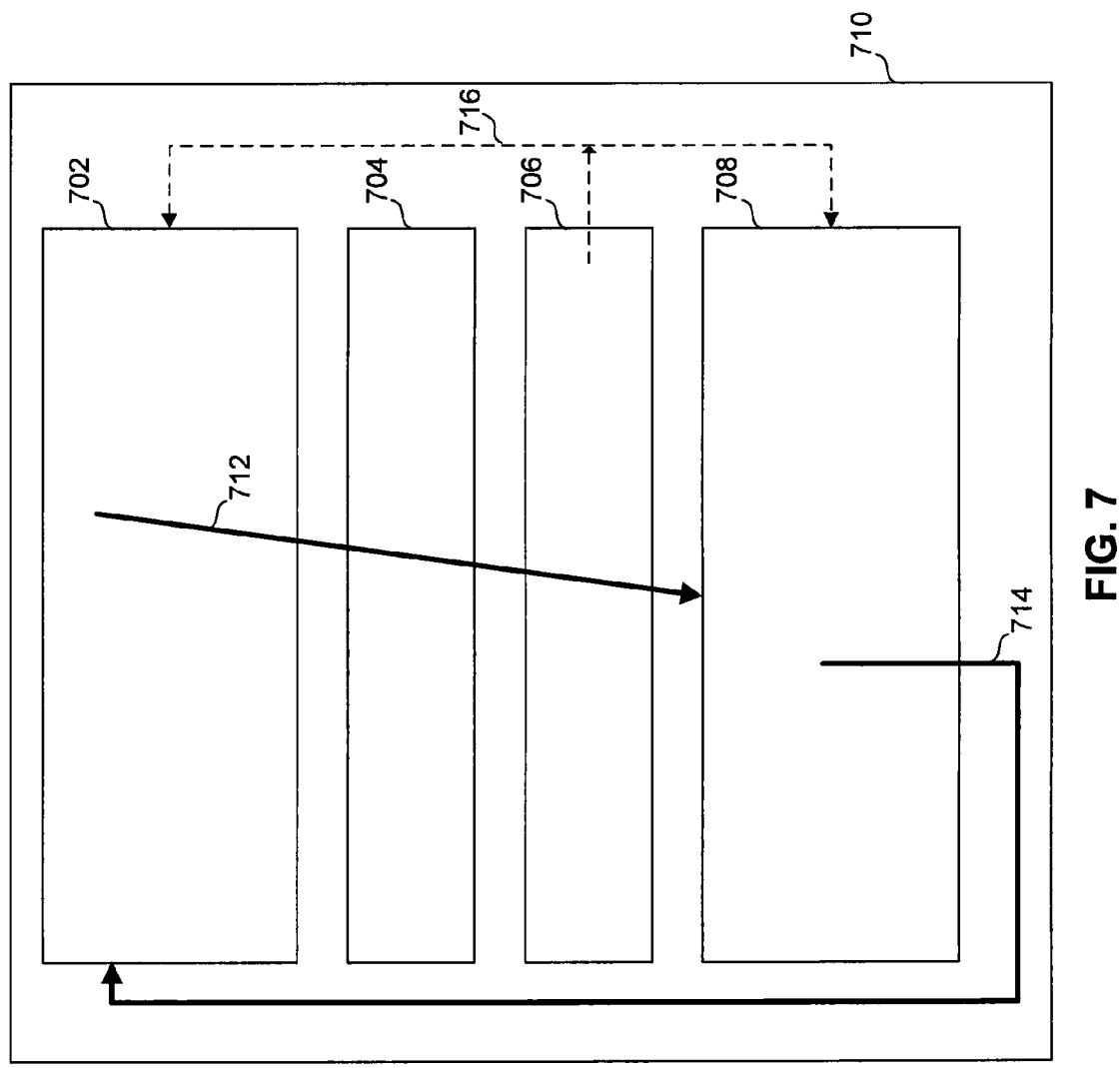
FIG. 7 illustrates another pointer for carrier services, according to an exemplary embodiment.

FIG. 7 illustrates examples of such a second pointer for carrier services, according to an exemplary embodiment. With reference to FIG. 7, multiple service carriers 702, 704, 706, and 708 are available in cell 710. It is possible that an MBMS or a broadcasting service may be specified to be carried by only some of the multiple service carriers, for example, carriers 702, 706, and 708, that may be available in cell 710. However, the MBMS data or the broadcasting service data may actually be transmitted only over carriers 702 and 708. Accordingly, pointers may indicate that carrier services 702 and 708 are the only two carrier services that provide data. Therefore, pointers indicating carrier services specify the location of carrier services within cell 710.

Therefore, in the exemplary embodiment shown in FIG. 7, pointers point to carrier services 702 and 708, through which the broadcasting service contents may be actually distributed. A pointer 712 in carrier service 702 specifies the position of carrier service 708, and indicates to a user that carrier service 708 contains the actual broadcasting service. This prevents a user from switching to carrier service 706. Although carrier service 706 is specified as carrying the broadcasting service, it does not actually contain contents of the MBMS data or the broadcasting service data. Similarly, a pointer 714 from carrier service 708 points to carrier service 702.

Pointers 716 from carrier service 706 point to carrier services 702 and 708, as they both may contain actual contents of the broadcasting service. Accordingly, if UE 114 attempts to connect to carrier service 706 to receive broadcasting services, UE 114 can quickly switch to one of the carrier services 702 and 708 that are specified by pointers 714 and actually carrying the contents of the broadcasting service.

Figure 8:
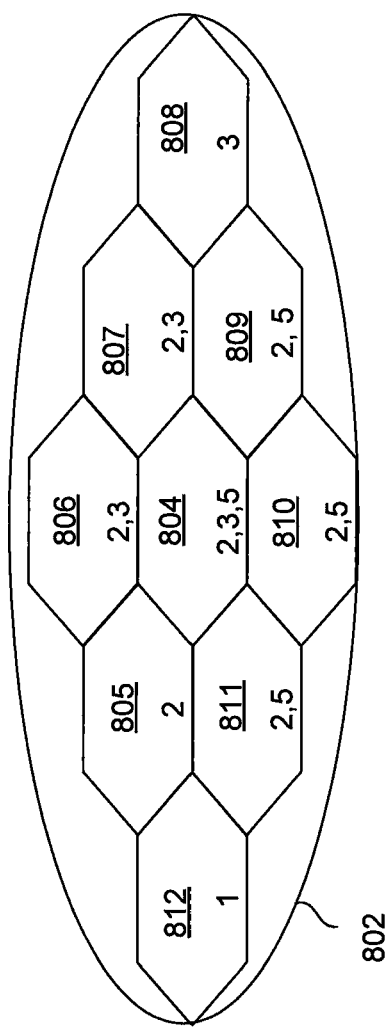
FIG. 8 illustrates a determination of edge cells for various carrier services within an MBSFN, according to an exemplary embodiment.

FIG. 8 illustrates a determination of edge cells for various carrier services within an MBSFN, according to an exemplary embodiment. For example, an MBSFN 802 includes carrier services 1, 2, 3, and 5. A plurality of cells (804-812) are illustrated showing the carrier services provided within each of the cells from carrier services 1, 2, 3, and 5. For example, in cell 804, the MBMS or broadcasting services are provided by carrier services 2, 3, and 5. Cell 804 additionally can be considered an edge cell with respect to carrier service 3, since cells 805, 809, 810, and 811 do not provide carrier service 3. Cell 804 can also be considered an edge cell for carrier service 5, since cells 805, 806 and 807 do not provide carrier service 5. An LCM value based on service identity numbers can be calculated to determine edge cells with respect to carrier services. For example, for cell 804, the LCM value for service identities for the carrier services 3 and 5, for which cell 804 serves as an edge cell, is 15. Accordingly, that value may be stored with respect to cell 804. Then, the UE can determine by checking the LCM function whether it is located within an edge cell of carrier 3 or 5 service. Accordingly, if it is in such an edge cell, the UE can read the pointers described with respect to FIG. 7 to seek carrier services that provide broadcasting services in another cell of MBSFN 802.

In the exemplary embodiment illustrated in FIG. 8, these pointers pointing to locations of carrier services may be stored in SIBs or MCCHs.

Figure 9:
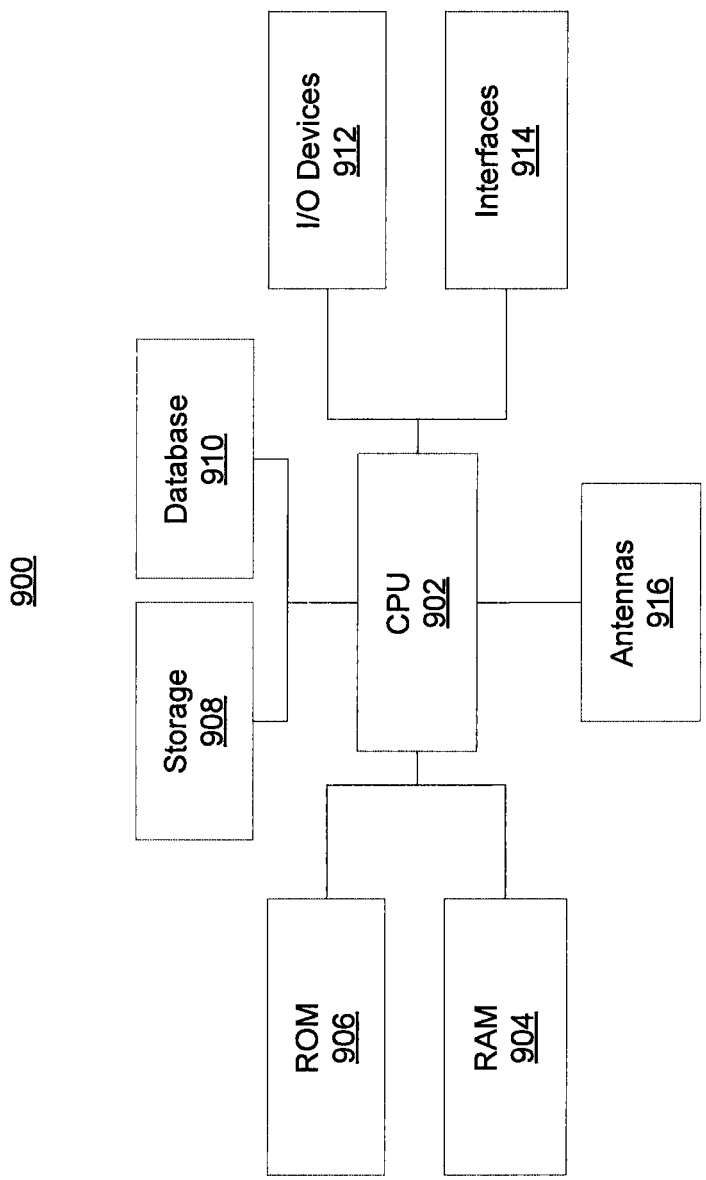
FIG. 9 illustrates a block diagram of a base station, according to an exemplary embodiment.

FIG. 9 illustrates a block diagram of a base station 900, according to an exemplary embodiment. For example, the base station 900 may be any base station noted above, as explained in the embodiments shown in FIGS. 1-8. Referring to FIG. 9, base station 900 may include one or more of the following components: at least one central processing unit (CPU) 902 configured to execute computer program instructions to perform various processes and methods; random access memory (RAM) 904 and read only memory (ROM) 906 configured to access and store information and computer program instructions; storage 908 to store data and information; database 910 to store tables, lists, or other data structures; I/O devices 912; interfaces 914; antennas 916, etc. Each of these components is well known in the art and will not be discussed further.

Figure 10:
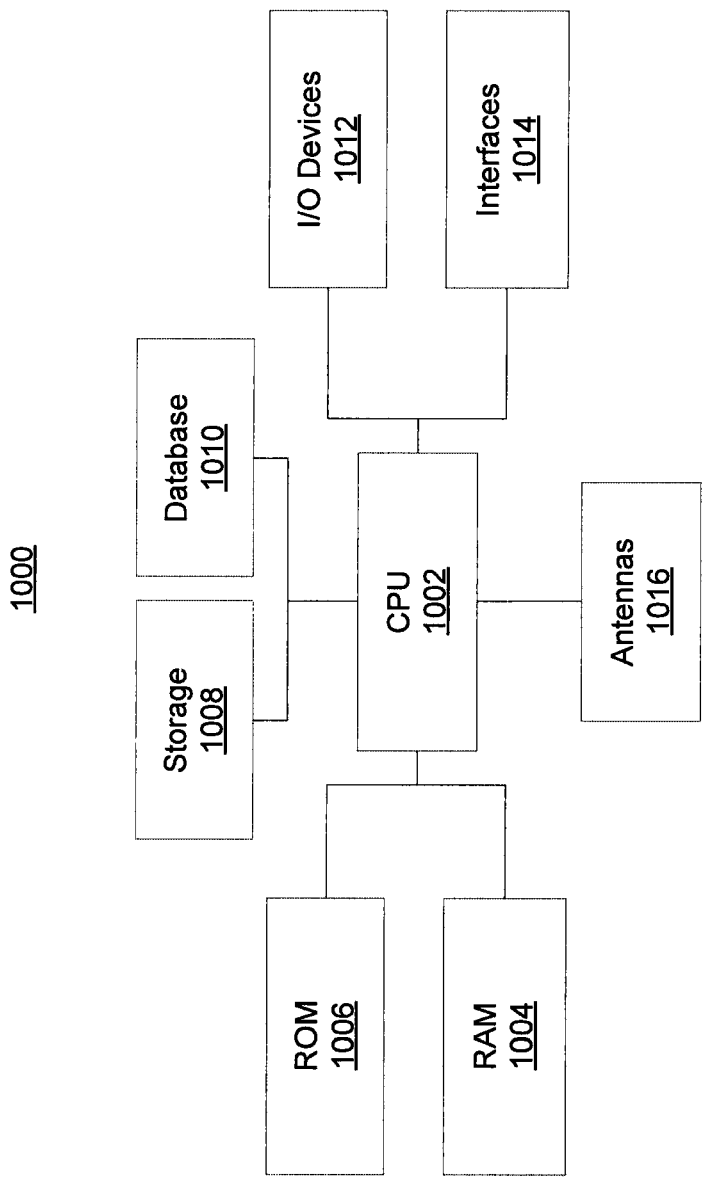
FIG. 10 illustrates a block diagram of a UE, according to an exemplary embodiment.

FIG. 10 illustrates a block diagram of a UE 1000, according to an exemplary embodiment. For example, UE 1000 may be any UE noted above, as explained in the embodiments shown in FIGS. 1-8. Referring to FIG. 10, UE 1000 may include one or more of the following components: one or more central processing units (CPU) 1002 configured to execute computer program instructions to perform various processes and methods; random access memory (RAM) 1004 and read only memory (ROM) 1006 configured to access and store information and computer program instructions; storage 1008 to store data and information; database 1010 to store tables, lists, or other data structures; I/O devices 1012; interfaces 1014; antennas 1016, etc. Each of these components is well known in the art and will not be discussed further.

While certain features and embodiments have been described, other embodiments will be apparent to those skilled in the art from consideration of the specification and practice of the embodiments disclosed herein. Furthermore, although aspects of embodiments have been described in part as software, computer-executable instructions, and/or other data stored in memory and other storage media, one skilled in the art will appreciate that these aspects can also be stored on or read from other types of tangible, non-transitory computer-readable media, such as secondary storage devices like hard disks, floppy disks, or CD-ROMs, or other forms of RAM or ROM. Further, the steps of the disclosed methods may be modified in various ways, including by reordering steps and/or inserting or deleting steps, without departing from the principles of the invention.

It is intended that the specification and examples be considered as exemplary only, with a true scope and spirit of the invention being indicated by the following claims.

What is claimed is:

1. A method of providing service among a plurality of Multicast Broadcast Single Frequency Networks (MBSFNs) for a user equipment (UE) of a wireless communication system, the method comprising:

receiving data by the UE from a base station that is included in a first one of the MBSFNs;

determining by the UE whether the received data includes a pointer to a second one of the MBSFNs, the pointer stored in a multimedia broadcast multicast service (MBMS) control channel (MCCH) of the first one of the MBSFNs and pointing to either a location of MCCH or MBMS data in the second one of the MBSFNs or the pointer stored in a system information block of the first one of the MBSFNs and pointing to the location of the MCCH in the second one of the MBSFNs or the location of the MCCH in the first one and the second one of the MBSBNs; and sending by the UE a service join request to the second one of the MBSFNs for continuing a MBMS being received from the first one of the MBSFNs based on the pointer.

2. The method of claim 1, further comprising:
determining whether a serving cell is an edge cell of the first MBSFN before determining whether the received data includes the pointer.

3. The method of claim 2, wherein determining whether the serving cell is an edge cell comprises inspecting a list of edge cells accessible to the UE to check whether the serving cell is listed as an edge cell or performing a calculation based on a least common multiple of edge cell identities.

4. The method of claim 2, if the serving cell is not an edge cell of the first MBSFN, the UE does not process the step of determining whether the received data includes the pointer.

5. The method of claim 2, if the serving cell is not an edge cell of the first MBSFN, the UE does not process the step of sending the service join request to the second one of the MBSFNs.

6. The method of claim 2, further comprising:
responsive to a determination that the pointer is stored in the MCCH of the first MBSFN and pointing to the location of MBMS data in the second MBSFN, need not reading the MCCH of the second MBSFN.

7. The method of claim 1, wherein the system information block of the first MBSFN contains frequency information of the first MBSFN, the second MBSFN, or the first MBSFN and the second MBSFN.

8. A user equipment (UE) to receive a multimedia broadcast multicast service (MBMS), comprising one or more processors, the one or more processors being configured to:
receive data from a base station that is included in a first one of Multicast Broadcast Single Frequency Networks (MBSFNs);
determine whether the received data includes a pointer to a second one of the MBSFNs, the pointer stored in a multimedia broadcast multicast service (MBMS) control channel (MCCH) of the first one of the MBSFNs and pointing to either a location of MCCH or MBMS data in the second one of the MBSFNs or the pointer stored in a system information block of the first one of the MBSFNs and pointing to the location of the MCCH in the second one of the MBSFNs or the location of the MCCH in the first one and the second one of MBSFNs; and
send a service join request to the second one of the MBSFNs for continuing the MBMS being received from the first one of the MBSFNs based on the pointer.

9. The user equipment of claim 8, wherein the one or more processors are further configured to:
determine whether a serving cell is an edge cell of the first MBSFN before determining whether the received data includes the pointer.

10. The user equipment of claim 9, wherein it is determined whether the serving cell is an edge cell by inspecting a list of edge cells accessible to the UE to check whether the serving cell is listed as an edge cell or by performing a calculation based on a least common multiple of edge cell identities.

11. The user equipment of claim 9, if the serving cell is not an edge cell of the first MBSFN, the UE does not process the step of determining whether the received data includes the pointer.

12. The user equipment of claim 9, if the serving cell is not an edge cell of the first MBSFN, the UE does not process the step of sending the service join request to the second one of the MBSFNs.

13. The user equipment of claim 8, wherein the system information block of the first MBSFN contains frequency information of the first MBSFN, the second MBSFN, or the first MBSFN and the second MBSFN.

14. The user equipment of claim 8, wherein responsive to a determination that the pointer is stored in the MCCH of the first MBSFN and pointing to the location of MBMS data in the second MBSFN, the user equipment does not need read the MCCH of the second MBSFN.

15. A non-transitory computer readable recording medium for storing one or more programs, capable of implementing the method according to any one of claims 1-5 and 6 after the program is loaded on a computer and is executed.

\* \* \* \* \*